Feb. 2, 1960 F. LJUNGSTROM 2,923,535
SITU RECOVERY FROM CARBONACEOUS DEPOSITS
Filed Feb. 11, 1955 5 Sheets-Sheet 1

INVENTOR.
Fredrik Ljungstrom
BY
Sol Shapiro

Feb. 2, 1960     F. LJUNGSTROM     2,923,535
SITU RECOVERY FROM CARBONACEOUS DEPOSITS
Filed Feb. 11, 1955     5 Sheets-Sheet 2
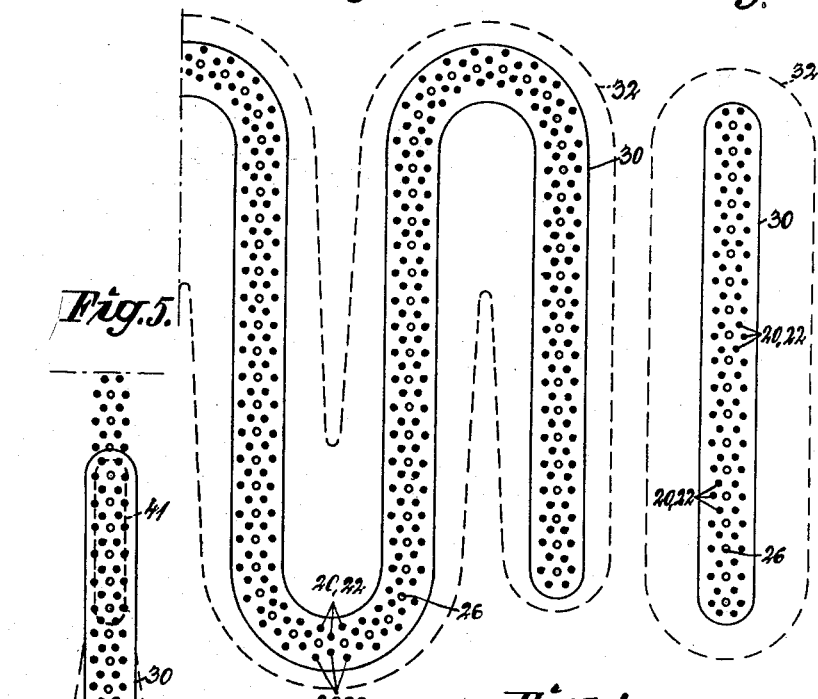
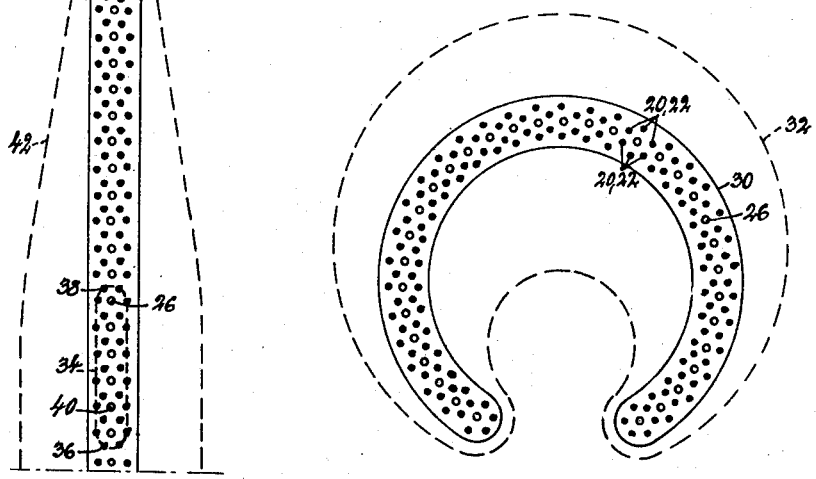
INVENTOR.
Fredrik Ljungstrom
BY
Sol Shappirio

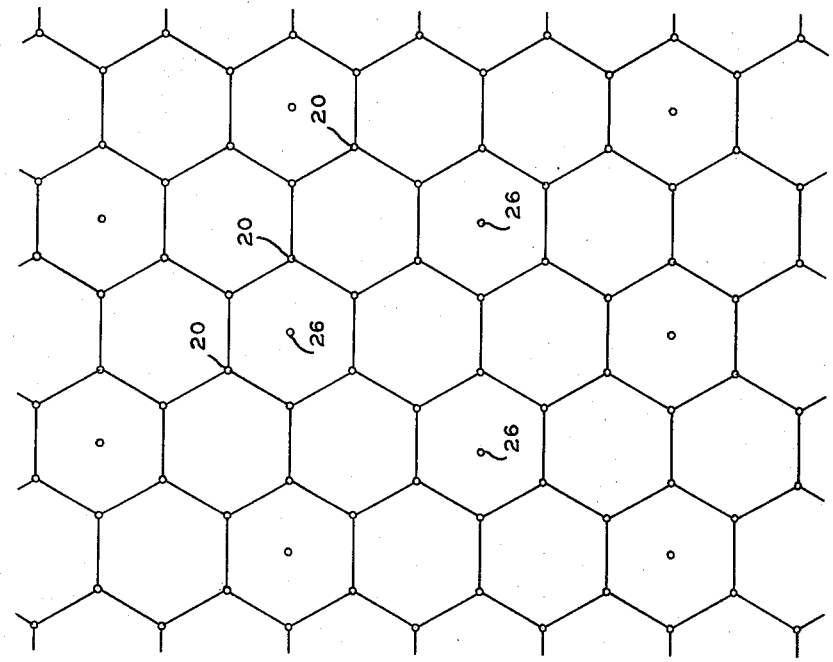
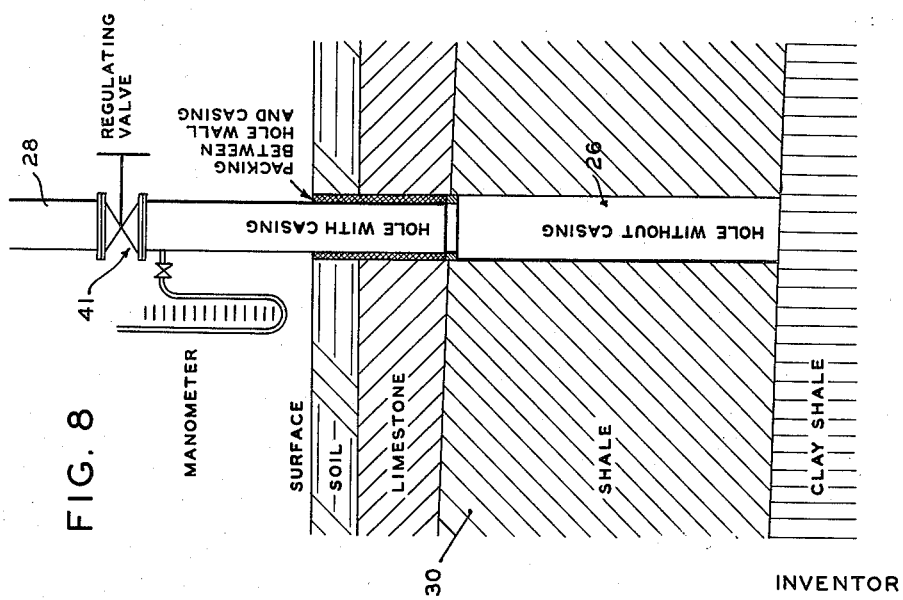

Feb. 2, 1960 F. LJUNGSTROM 2,923,535
SITU RECOVERY FROM CARBONACEOUS DEPOSITS
Filed Feb. 11, 1955 5 Sheets-Sheet 5

INVENTOR
FREDRIK LJUNGSTROM
BY Sol Shappirio
ATTORNEY

United States Patent Office 2,923,535
Patented Feb. 2, 1960

2,923,535

SITU RECOVERY FROM CARBONACEOUS DEPOSITS

Fredrik Ljungstrom, Fiskebackskil, Sweden, assignor, by direct and mesne assignments, of one-half to Svenska Skifferolje Aktiebolaget, Orebro, Sweden, a corporation of Sweden, and one-half to Husky Oil Company, Cody, Wyo., a corporation of Delaware Application February 11, 1955, Serial No. 487,681

13 Claims. (Cl. 262—3)

This invention relates to a method of recovering useful gases, primarily combustible gases, by gasifying subterraneous fuel layers, such as coal and shale layers, in their natural condition. It is known to gasify such fuel layers by pressing air or oxygen down into the same, the gaseous fuel thus obtained being conveyed up above earth through channels bored into the ground and into the fuel layer. The provision of these channels for the supply of oxygen and for the collection of the gaseous fuel is connected with great costs, inasmuch as they must be made to a sufficient size for the performance of manual working operations at the bottom and along the fuel layers. The costs increase with the depths, and in particular the method cannot be realized in practice when the fuel strata occur in layers, which are vertically separated by rock or earth layers that are not fuel-carrying. The fuel layers, such as coal strata, may be of so little richness in the vertical direction that they cannot be worked, unless non-combustible layers thereabove or therebeneath are removed. It is understood that the digging or blasting of adits in the surface extension of such strata becomes particularly expensive, and, consequently, uneconomical.

It is an object of the invention to overcome these drawbacks, so that the calories of the fuel layers may be recovered in a manner saving work and consequently being favorable from an economical point of view, even if the fuel-carrying strata lie very deeply in the ground or are rather poor.

Further objects and advantages of the invention will be apparent from the following description considered in connection with the accompanying drawings, which form a part of this specification, and of which:

Figure 2 shows diagrammatically a top view of a plant adapted for the gasification, on a reduced scale.

Figures 3–5 are views similar to Fig. 2 of plants in accordance with three modifications.

Figure 8 is a detail vertical section of a channel in said shale deposit equipped for products recovery.

Figure 9 is a plan view illustrating the channel distribution in a field.

Figure 1:
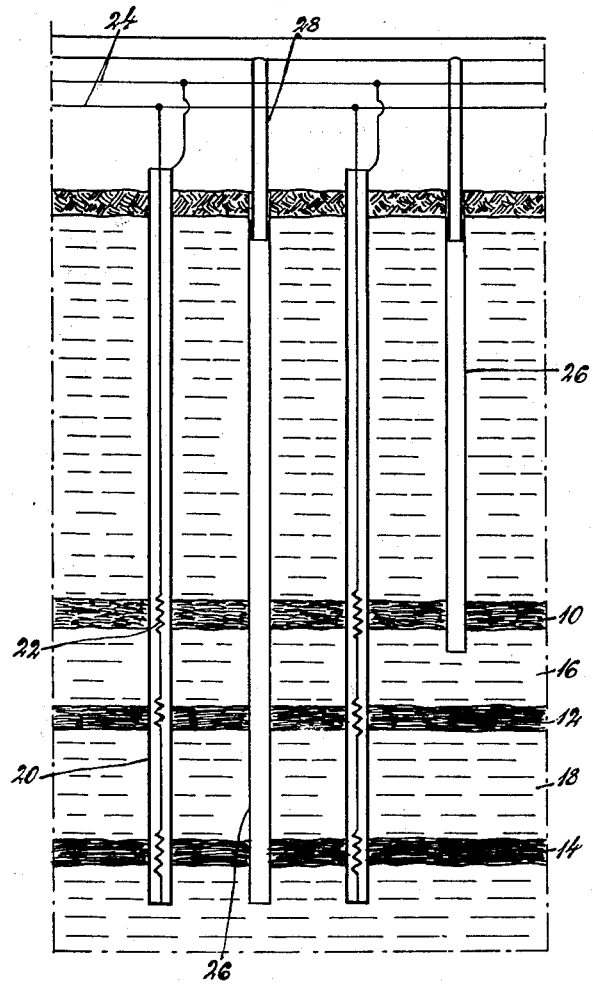
Figure 1 shows more or less diagrammatically a vertical sectional view of a portion of the ground or a rock formation with a plant to perform the gasification according to the invention.

In accordance with the present invention, a subterraneous stratum of carbonaceous material of essentially solid character and relatively impermeable to flow of gas therethrough is treated in situ by electrically preheating a localized portion thereof at a temperature usually at least that of the boiling point of water but below that of substantial vaporization of oil. In this way gases which may be water vapor alone or other gases or vapors as well are produced resulting in the preheated stratum becoming permeable. Gases and any vapors formed are desirably exhausted from the stratum. Since the stratum is now porous, an oxygen containing gaseous medium is introduced to the permeable stratum desirably while still hot from the preheating step, to initiate combustion to heat the stratum in said second heating step to a temperature at which oil vaporization or pyrolysis or both, takes place and the products thus formed are removed, desirably at a zone spaced laterally from that where the combustion medium was introduced thus enabling the desirable products of oil vaporization and pyrolysis produced during combustion to be collected separately from and without substantial dilution by water vapor and gases and vapors produced in the preheating step at temperatures below that of substantial oil vaporization.

The combustion in the second heating step burns up coke formed in situ during the preheating step but may also include combustion of a part of the carbonaceous material of the stratum. The latter, however, is largely converted into desirable products of oil vaporization and pyrolysis. The temperature in the preheating step may be as desired below that of substantial vaporization of oil. Usually it will range from about 100° C. to as high as about 250° C. Thus it may be at about 100° C. to produce water vapor primarily. The second step (combustion) will usually be at a temperature above that of oil vaporization, for example about 300° C. and may be as high as desired but below that of decomposition of valuable products beyond the thermal and oxidation degree desired. A desirable range will usually be between about 300° C. and 550° C., and more desirably between 300 and 400° C. The temperature in either stage may be controlled depending on the nature of the formation and carbonaceous material, and the products desired, and also on the pressure maintained or permitted to build up, and amount of oxidizing gas introduced. The preheating may be carried out so that self-ignition takes place upon introduction of the oxygen-containing gas.

While the preheating step may be carried out in one stage only, it may be carried out in successive stages of temperature such as a first stage of 100° C. to 250° C., and a second stage of, for example, 300° C. or higher in the absence of oxygen after which the combustion step is carried out. Other modifications and variations will appear below.

In the drawings 10, 12, 14 designate a number, in the present instance three fuel layers, such as coal strata located at a more or less great depth in the ground, said fuel layers being separated by layers 16, 18 of non-combustible material. Channels are bored into the ground, some of which, denoted by 20 in the drawings, have electrical resistances 22 introduced into the same, which resistances are connected to a supply network 24, whereas other channels 26 are open and connected at the top to a pipe conduit system 28. Electrical heating elements 22 may be arranged in holes 20 in groups comprising six elements about a common gas exhaust passage 26, as will appear from Figures 2–5. Channel groups 20, 26 are combined into a figure, which is elongated when viewed from above, the same comprising for instance single row of discharge passages 26 surrounded by channels 20 with heating elements. Such group rows may be straight in accordance with Figure 2, or, may form one or more serpentines according to Figure 3, or a horse-shoe-like configuration according to Figure 4. It is desirable that the groups of holes form together an integral chain of small width relative to their horizontal extension.

When the recovery process is initiated, electrical energy is as a first step, supplied to resistance elements 22, which are shaped to give off heat at the levels only where the fuel stratum or strata are located. This supply of heat results in combustible substances being extracted from the fuel layers in a gaseous state, while a residue of coke is obtained at the same time. The combustible gases escape through passages 26 and are collected by conduit system 28. This electrical heating of the fuel layer results in the layer becoming porous or pervious to gas in the horizontal direction within a fuel vein designated by 30 in Figures 2–5, said vein having a great length relative to the width thereof. After the electrically performed gasification process has been carried out, air or oxygen is introduced under pressure through one or more passages 26, said air or oxygen finding its way through fuel vein 30 on account of the porosity thereof, a gasification process of the remaining coke layers being then initiated by combustion. The combustible gases thus developed are drawn off through one or more passages 26, which are in suitable spaced relation from the oxygen supply channels. In this stage of the gasifying process heat is formed which is transferred by conduction to the side portion of fuel vein 30, by reason of which the gasification of the fuel layer proceeds in such manner that the porous fuel layer is widened continuously. After a certain time it may thus have been increased from the outline 30 to the outline 32 as shown in Figures 2, 3 and 4.

According to the invention, it is thus necessary to subject some of the fuel carrying layers to electrical heating, whereas the remainder or the major portion thereof are gasified during the subsequent gasification by means of oxygen or air, which is rendered possible by the electrical heating and which depends on chemical reactions setting in through combustion. The method according to the invention therefore permits the utilization of fuel layers, even if they be comparatively thin and are located at a great depth underneath the surface of the ground, in an economically satisfactory manner.

In the embodiment according to Figure 5, electrical energy is supplied to a first group of heating elements within the channel groups enclosed by outline 34 represented in dash lines. The electrical connections may be switched in successively, so that resistance 36, for example, is switched in for a period of say 100 days, when resistance 38 is switched in, the intermediate resistances then showing a gradually increasing time of remaining in the circuit. In this manner, a vein of porous fuel mass is obtained which grows slowly in its longitudinal direction. After the electrical gasification has been substantially terminated, for instance upon the laps of say 150 days, one or more exhaust channels 40 within group 34 may be connected to means for supplying oxygen or air. In the meantime, electrical heating continues in adjacent portions of the fuel layer, which is then followed by the gasification with supply of oxygen. In this latter gasification process, the fuel layer on both sides of the portion of the fuel first made porous by electrical heating, will be heated by having heat imparted thereto through the intermediary of heat of reaction, the fuel portion subjected to recovery being thus caused to expand continuously so as to reach outline 42 after a certain lapse of time. As will be seen from Figure 5, the portion of the fuel subjected to gasification and location outside portion 30 is first comparatively narrow, in order then to expand more and more. By connecting a suitable number of exhaust passages 26 to the system in the widest and last portion of the gasifying zone as shown in Figs. 2, 4 and 5 and by introducing oxygen into a suitable number of channels in the narrower front portion of the gasification portion, the gasification may be directed so that the process proceeds under favorable temperature conditions. After a certain time, the zone subjected to electrical heating has advanced to the channel groups enclosed by line 41 represented by dash lines.

The heat conducting capacity of the heated fuel layer determines the lateral expansion of the heated portion, the quantity of heat imparted to the side portion by heat conduction being limited by the reaction temperature found to be most suitable and being chosen in an appropriate manner by variation of the oxygen supply in connection with the heat transfer to the surroundings. Alternatively, passages 26 may be brought into communication with conduits for supply of oxygen or air, or with gas collecting conduits to ensure reciprocal action between oxygen supply and gasification, for securing favorable chemical reactions in the body of fuel.

Electrical heating need not necessarily be carried so far as to create pyrolysis in the fuel layer, but may be restricted to cause evaporation of moisture contained therein. This evaporation may then be sufficient to create the porosity of the fuel layer necessary for the subsequent supply of oxygen and for drawing off the combustible gases. The heat expansion of the fuel layer created by the heating, also contributes to this effect, such expansion being particularly concentrated to the nearest environment about the heating elements. It will be found suitable to carry out electrical heating primarily in the channel or channels through which oxygen is to be supplied later on, so far that the fuel is self-ignited when the supply of oxygen is started.

The following example illustrating an actual field operation is given.

Figure 6:
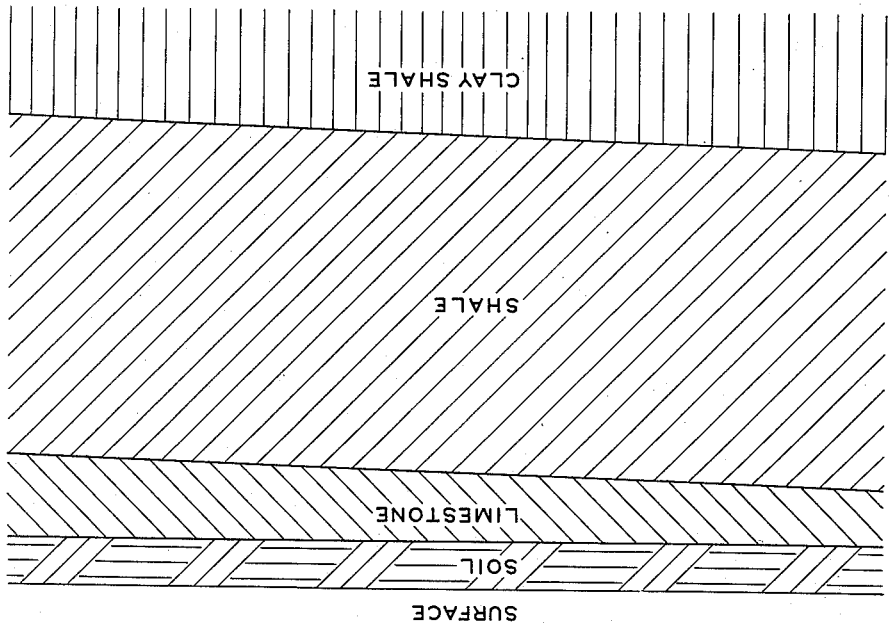
Figure 6 is a vertical section through a shale deposit illustrative of strata in which the present invention may be utilized.

The operations were made near Kvarntorp, Sweden. The shale deposit had a thickness of about 57 feet and was covered with a limestone layer, 7–46 feet thick. On the top of the limestone was a soil layer of about 6 feet. A section through the deposit is shown in Figure 6. On the spot, where the measurements were made, the limestone thickness was about 43 feet.

In a field 592 feet in width, holes were drilled through the overburden and to the bottom of the shale layer (total hole length about 100 feet). The hole diameter was 2¼". The holes 20 were distributed over the field in a hexagonal pattern, shown in Figure 9. The distance between the holes was about 9 feet. In the holes in the corners of the hexagons were inserted electrical heating elements. A power of 10 kilowatts was evenly distributed over the part of the element, which was placed in the oil shale. The upper part of the hole was not heated. The heat supply thus corresponded to about 200 watt per foot shale thickness.

Figure 7:
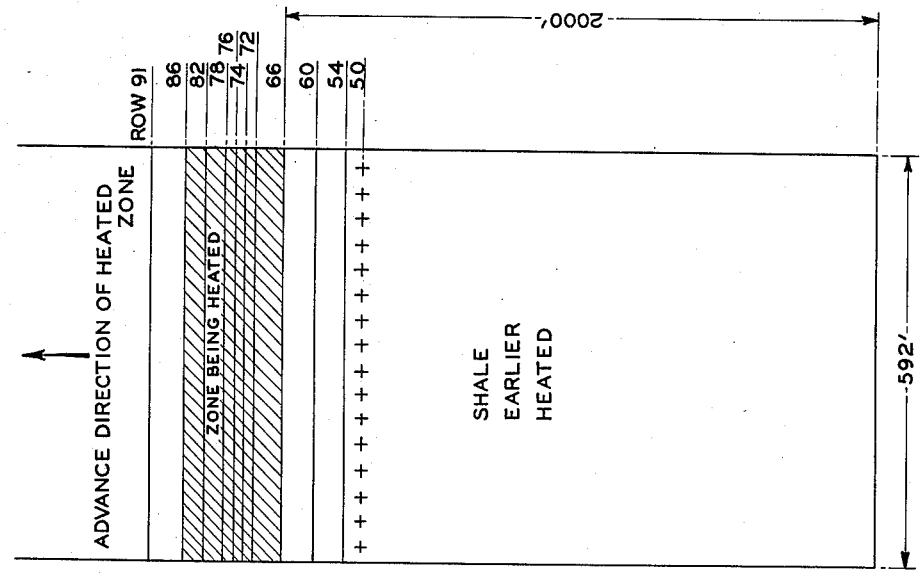
Figure 7 is a plan view illustrating successive heating zones in an advancing heating zone.
Figure 10:
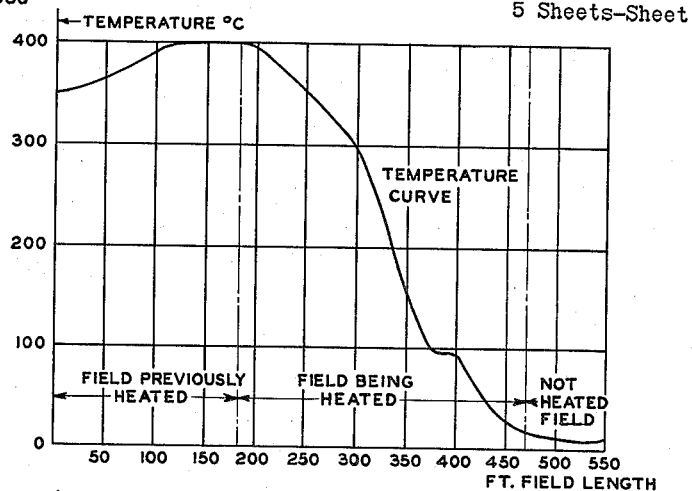
Figure 10 is a graph of a temperature curve illustrating successive zone temperatures in a shale layer undergoing treatment in accordance with the present invention.

The heat was supplied continuously during about seven months, whereby the shale layer was heated to an average temperature of 400° C. The different rows e.g. 50—91 of Figure 7, of holes 20 were connected at different intervals. Thus an advancing heating front was created. The temperatures of the shale were measured in three (3) holes in each element row. A section through the fields is shown in Figure 10 together with the temperature curve.

Figure 11:
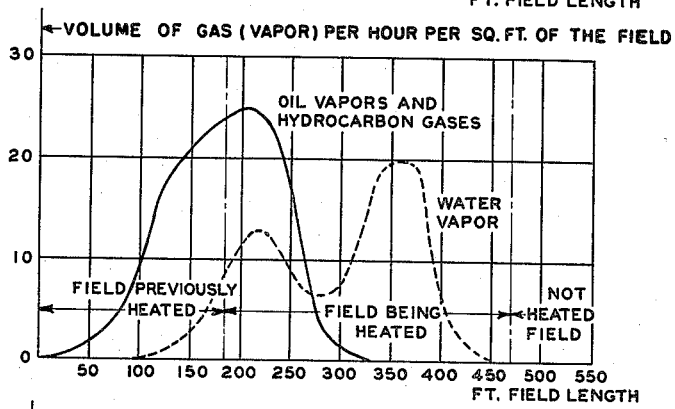
Figure 11 are curves illustrating relative volumes of gases and vapors evolved in different zones of heated shale.

At about 100° C. the moisture of the shale was vaporized and when the temperature reached 300° C. the formation of oil vapors and gases started. Such products were evolved up to 400° C. Thus there was an evolution of vapors in the different zones of the heated field as shown in Fig. 11. In the centers of every third hexagon a gas well was drilled through which the vapors and gases were collected. From the top of each gas well the products were piped to the condensation plant, where water and oil were condensed.

At the moment when the measurements were made, the heating front had travelled about 2,000 feet from the starting line. The total evolution of products from the shale was 20 barrels of oil, 25 barrels of water and 120,000 cu. ft. of uncondensable gas per hour, corresponding to about 800,000 cu. ft. of gas and vapors together at the temperatures of the heated shale.

Figure 12:
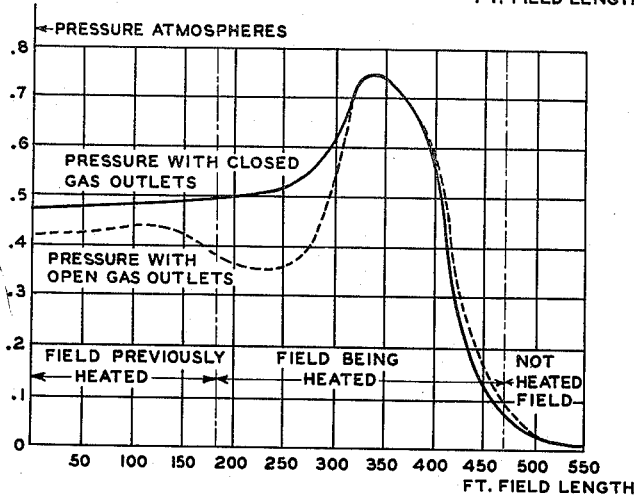
Figure 12 illustrates pressure curves through the field.

During the ordinary production conditions the gases and vapors build up a certain superpressure in the shale. The pressures at different points are shown in Table 1 and Figure 12.

TABLE 1

*Pressures in the field under ordinary production conditions (gas outlets open)*

| Row | A | B | C | D | E | F | G | H | I | J | K | L | M | Average pressure |
|---|---|---|---|---|---|---|---|---|---|---|---|---|---|---|
| 50 | .43 | .43 | .43 | .44 | .44 | .43 | .41 |  |  | .43 | .43 | .43 | .41 | .43 |
| 54 | .41 | .39 | .43 |  | .39 |  | .44 | .44 | .44 | .44 | .44 |  | .44 | .43 |
| 60 |  | .44 | .44 | .44 | .44 | .44 | .44 | .44 | .44 | .44 | .44 | .44 | .44 | .44 |
| 66 |  |  |  | .35 | .38 | .33 | .40 | .33 | .38 | .39 | .38 | .39 | .38 | .37 |
| 72 | .43 | .41 | .39 | .40 | .42 | .44 | .36 | .36 | .37 | .33 | .35 | .36 | .41 | .39 |
| 74 |  | .52 | .39 |  | .35 |  | .69 | .66 | .53 | .56 | .39 |  | .48 | .51 |
| 76 | .53 |  |  |  |  |  | .74 | .73 |  |  |  |  |  | .70 |
| 82 | .59 | .61 | .64 | .65 | .66 | .64 | .69 | .56 | .61 | .67 | .64 | .61 | .59 | .63 |
| 86 | .13 | .09 | .17 | .17 | .17 | .19 | .16 | .23 | .16 | .16 | .15 | .26 | .24 | .18 |
| 91 | .00 | .01 | .00 |  | .07 |  | .10 |  | .08 |  |  |  |  | .04 |

All pressures in atmospheres.

All gas outlet valves were then closed. As heat was supplied continuously, gases and vapors were still formed. The only way for the flow of the product out of the shale then was a diffusion towards the surroundings in all directions. When the pressures were measured at the same test points as above it was found that the superpressure in the shale had increased, as shown in Table 2 and Figure 12. The measurements were made about 35 minutes after the valves were closed.

TABLE 2

*Pressures in the field with gas outlets closed*

| Row | A | B | C | D | E | F | G | H | I | J | K | L | M | Average pressure |
|---|---|---|---|---|---|---|---|---|---|---|---|---|---|---|
| 50 | .46 |  | .48 |  | .48 |  | .45 |  | .47 |  | .48 |  | .47 | .47 |
| 54 | .46 | .47 | .48 | .45 | .48 | .48 |  | .48 |  | .48 |  | .48 | .48 | .48 |
| 60 | .48 | .49 | .48 |  | .49 |  | .53 |  | .49 |  | .48 |  | .48 | .49 |
| 66 | .49 | .49 | .49 | .50 | .51 | .50 | .52 | .51 | .51 | .53 | .50 | .50 | .50 | .50 |
| 72 | .53 | .53 | .54 | .52 | .55 | .55 | .53 | .53 | .53 | .52 | .53 | .49 | .53 | .53 |
| 74 | .54 | .58 | .55 |  | .52 |  | .75 | .75 | .61 | .63 | .52 |  | .54 | .59 |
| 76 | .60 |  |  | .68 | .68 |  | .75 | .75 | .70 | .70 |  |  |  | .70 |
| 78 | .75 |  |  | .75 | .75 | .75 |  | .75 | .75 | .75 |  |  |  | .75 |
| 82 |  | .75 |  | .75 |  | .75 |  | .60 |  | .55 |  | .35 |  | .63 |
| 86 | .12 | .08 | .12 | .10 |  | .16 |  | .16 |  | .16 |  | .16 | .28 | .16 |
| 91 | .0 | .01 | .01 | .0 | .07 | .10 | .08 |  | .06 |  | .0 |  | .10 | .04 |

All pressures in atmospheres.

The pressure distribution around the zone, where the pressure is created (by chemical reactions), was measured. The pressure drop was different in different directions, showing a different porosity and permeability for the gas flow. The pressure drop in the shale, which had been heated to 400° C. was .013 atmosphere per 100 feet length, compared to 65 atmospheres per 100 feet length in shale, which had been preheated (to temperatures between 15° and 100° C.). When the superpressure was increased (by closing the gas outlets) the flow towards heated shale was still increased, while the flow towards cold shale was practically constant.

Thus it was demonstrated that the heating of the shale increased its porosity and its permeability for gases and vapors several times.

Having thus set forth my invention, I claim:

1. The method of treating in situ a subterraneous stratum of carbonaceous material of essentially solid character and relatively impermeable to flow of gas therethrough which includes the steps of preheating electrically a localized gas impermeable portion of said stratum at a temperature of from about 100° C. to a temperature below that of substantial oil vaporization while controlling the pressure in said preheated portion whereby gases are produced and the heated stratum becomes substantially permeable to gases, exhausting the gases formed from the heated stratum, thereafter introducing an oxygen containing gaseous medium under super-atmospheric pressure to said permeable stratum while still hot from the preheating step to heat said stratum in a second heating step to a temperature between that of oil vaporization and pyrolysis to form gaseous and vaporous products of combustion and removing the products formed during the second heating step from said stratum at a zone spaced laterally from the zone of introduction of said gaseous medium thus enabling the desirable products of oil vaporization and pyrolysis produced during combustion to be collected separately from and without substantial dilution by water vapor and gases and vapors produced in the preheating step at temperatures below that of substantial oil vaporization.

2. The method of claim 1 in which preheating is carried out at a temperature of about 100° C. to about 250° C. and the combustion step is carried out at a temperature of about 300° C. to about 550° C.

3. The method of claim 1 in which the preheating is carried out at a temperature of moisture evaporation and the second heating step is carried out at about 300° to about 400° C.

4. The method of claim 1 in which the heating steps are carried out in an advancing heating front by preheating a successive portion of the stratum while previously preheated stratum is subjected to the combustion step, and repeating said succession of preheating and combustion steps.

5. The method of claim 4 in which the electrical preheating step is carried out in channels and the oxygen containing gaseous medium is supplied through at least some of those channels to obtain self-ignition of carbonaceous material upon introduction of said oxygen containing gaseous medium.

6. The method as set forth in claim 1 in which said heating elements are located so that the electrical heating produces a vein of permeable material relatively long as compared with its width through which the combustion supporting gaseous medium flows to produce products of combustion, the heat generated by the combustion along said relatively narrow vein operating to render porous the adjacent portions of the stratum lying at either side of the vein.

7. The method as set forth in claim 1 in which the passages through which the combustion supporting gaseous medium is introduced into the stratum and through which the products of combustion are exhausted are spaced apart a greater distance than are the passages containing said electrical heating means and the passages through which the gases generated by the electrical heating are exhausted.

8. The method as set forth in claim 1 in which a multiplicity of said passages are located within the confines of relatively long and narrow paths and different ones of said passages are progressively used at different times for electrically heating and introducing the combustion supporting medium and for exhausting gases from said stratum so as to cause the process of combustion to travel progressively along the length of the vein defined by the location of the passages.

9. The method of treating in situ a subterraneous stratum of carbonaceous material of essential solid character and relatively impermeable to flow of gas therethrough which includes the steps of preheating electrically a localized gas impermeable portion of said stratum in two stages in substantial absence of oxygen to produce a stratum substantially permeable to gases, the first stage being carried out at a temperature of from about 100° C. to a temperature below that of substantial oil vaporization while controlling the pressure in said preheated portion and the second stage being carried out on the stratum while still hot and at a temperature up to that of pyrolysis while controlling the pressure in said preheated portion, whereby the stratum becomes substantially permeable to gases, recovering any gases and vapors formed during said preheating stages, thereafter introducing an oxygen containing gaseous medium under super-atmospheric pressure to said permeable stratum while still hot from the preheating steps to produce combustion and maintain the temperature between that of oil vaporization and pyrolysis to form gaseous and vaporous products and recovering said products at a zone spaced laterally from the zone of introduction of said gaseous medium thus enabling the desirable products of oil vaporization and pyrolysis produced during combustion to be collected separately from and without substantial dilution by water vapor and gases and vapors produced in the preheating step at temperatures below that of substantial oil vaporization.

10. The method of claim 9 in which preheating is carried out at a temperature of about 100° C. to about 250° C. and the combustion step is carried out at a temperature of about 300° C. to about 550° C.

11. The method of claim 9 in which the preheating is carried out at a temperature of moisture evaporation and the second heating step is carried out at about 300° to about 400° C.

12. The method of claim 9 in which the heating steps are carried out in an advancing heating front by preheating a successive portion of the stratum while previously preheated stratum is subjected to the combustion step, and repeating said succession of preheating and combustion steps.

13. The method of claim 9 in which the electrical preheating step is carried out in channels and the oxygen containing gaseous medium is supplied through at least some of those channels to obtain self-ignition of carbonaceous material upon introduction of said oxygen containing gaseous medium.

References Cited in the file of this patent

UNITED STATES PATENTS

| 1,457,479 | Wolcott | June 5, 1923 |
| 2,472,445 | Sprong | June 7, 1949 |
| 2,634,961 | Ljungstrom | Apr. 14, 1953 |

FOREIGN PATENTS

| 523,333 | France | Apr. 19, 1921 |